United States Patent [19]

Lefebvre

[11] Patent Number: 5,243,528
[45] Date of Patent: Sep. 7, 1993

[54] LAND VEHICLE NAVIGATION APPARATUS WITH VISUAL DISPLAY

[75] Inventor: Rebecca K. Lefebvre, Arlington Heights, Ill.

[73] Assignee: Motorola, Inc., Schaumburg, Ill.

[21] Appl. No.: 581,495

[22] Filed: Sep. 12, 1990

[51] Int. Cl.$^5$ ............................................. G06F 15/50
[52] U.S. Cl. ..................................... 364/449; 364/444; 340/990; 340/995
[58] Field of Search ............... 340/988, 990, 995, 996, 340/701, 703, 721, 729; 364/449, 444, 443, 446, 424.01, 424.02; 395/103, 127, 128, 135, 138, 139

[56] References Cited

U.S. PATENT DOCUMENTS

| | | | |
|---|---|---|---|
| 4,511,973 | 4/1985 | Miura et al. | 364/449 |
| 4,570,227 | 2/1986 | Tachi et al. | 364/444 |
| 4,635,202 | 1/1987 | Tsujii et al. | 364/449 |
| 4,679,147 | 7/1987 | Tsujii et al. | 364/449 |
| 4,716,404 | 12/1987 | Tabata et al. | 340/995 X |
| 4,757,455 | 7/1988 | Tsunoda et al. | 364/449 |
| 4,761,742 | 8/1988 | Hanabusa et al. | 364/443 |
| 4,763,270 | 8/1988 | Itoh et al. | 364/449 |
| 4,774,672 | 9/1988 | Tsunoda et al. | 364/449 |
| 4,782,447 | 3/1986 | Ueno et al. | 364/449 |
| 4,796,189 | 1/1989 | Nakayama et al. | 364/449 |
| 4,827,420 | 5/1989 | Musa | 364/449 |
| 4,896,154 | 1/1990 | Factor et al. | 340/995 |
| 4,897,792 | 1/1990 | Hosoi | 364/449 |
| 4,914,605 | 4/1990 | Loughmiller, Jr. et al. | 364/443 X |
| 4,926,336 | 5/1990 | Yamada | 364/444 |
| 4,937,570 | 6/1990 | Matsukawa et al. | 340/995 X |
| 4,937,752 | 6/1990 | Nanba et al. | 364/449 |
| 4,951,211 | 8/1990 | De Villeroche | 364/444 |
| 4,951,212 | 8/1990 | Kurihara et al. | 364/449 |
| 4,963,864 | 10/1990 | Iihoshi et al. | 364/449 X |
| 4,974,170 | 11/1990 | Bouve et al. | 364/444 X |
| 4,989,151 | 1/1991 | Nuimura | 364/449 |
| 4,992,947 | 2/1991 | Nimura et al. | 364/444 |
| 5,089,826 | 2/1992 | Yano et al. | 364/449 X |

OTHER PUBLICATIONS

*Transportation for the Future*, "Automobile Navigation Technology: Where Is It Going?" by Robert L. Franch, May 24-25, 1988.

Primary Examiner—Vincent N. Trans
Assistant Examiner—Thomas S. Auchterlonie
Attorney, Agent, or Firm—Phillip H. Melamed; John H. Moore

[57] ABSTRACT

Land vehicle navigation apparatus (10) with a visual display (16, 20) is provided. The apparatus provides a visual display of a calculated navigation route (22) with a visual indication (23) of the direction of desired travel along the navigation route. An off route map display portion (28) is provided which has the visual navigation route display (22) in one color and, in a second contrasting color, a visual display (24, 26) of actual vehicle travel. A separate additional feature is that an off route display (20) provides a visual display portion (29) of a plurality of operator selectable off route recovery options (1-6). Off route recovery means (12, 49-63) are provided such that the vehicle operator can implement the visually displayed recovery options. The result is a navigation system which visually provides vehicle navigation information to the vehicle operator in an improved minimal comprehension time format, and allows the vehicle operator to select for himself how to recover from an off route condition.

37 Claims, 4 Drawing Sheets

LAND VEHICLE NAVIGATION APPARATUS WITH VISUAL DISPLAY

FIELD OF THE INVENTION

The present invention relates to the field of land vehicle navigation apparatus which provides a visual display to the operator (driver) of a land vehicle. More specifically, the present invention relates to the type of land vehicle navigation visual displays which are produced so as to more readily assist the vehicle driver with vehicle navigation.

BACKGROUND OF THE INVENTION

Some prior land vehicle navigation apparatus calculate a desired navigation route, via fixed road path information stored in a memory, between a start location of the vehicle and a desired destination location. Some of these systems then determine estimated current vehicle position by dead reckoning and/or other vehicle location techniques, and provide audible and/or visual route guidance to the vehicle operator to guide the vehicle along the desired vehicle navigation route. One such prior system is described in co-pending U.S. patent application Ser. No. 07/543,319 to Smith, entitled, "Land Vehicle Navigation Apparatus", which is assigned to the same Assignee as the present invention. Other such vehicle navigation systems are described in the article, "Automobile Navigation Technology; Where is it Going?" by Robert L. French prepared for the, "First Transportation for the Future Conference" held in May, 1988.

Some prior navigation systems illustrate the navigation route, via fixed road paths, which they calculate between a start location and a desired destination. Other navigation systems just provide vehicle maneuver information at various intersections along the calculated navigation route. Some prior systems display in visual highlighted form the progress, actual vehicle travel track, of a vehicle along predetermined road paths which are defined by map information stored in a memory. Some systems such as those mentioned above have been commercially marketed, but they have failed to achieved wide spread commercial success.

One of the problems which must be solved in vehicle navigation systems is how to rapidly convey to the vehicle operator sufficient navigation information, and how this can be achieved without causing any excessive distraction of the vehicle operator while he is driving the vehicle. Audible navigation maneuver instructions may not efficiently provide sufficient navigation information to the driver, and therefore visual navigation display information will also typically be provided. However, some prior visual navigation displays are complex and require a lengthy comprehension time for the vehicle driver. This is not only undesirable but represents a potentially dangerous situation since the vehicle driver may be distracted from his primary function of driving the land vehicle. If only very simple visual displays are provided, such as just illustrating desired turns, then sufficient navigation information may not be provided to the driver, especially if the driver varies from his planned navigation route.

It is often necessary and/or desirable to advise the operator when he has deviated from a desired planned navigation route. Prior systems which have advised the operator when he is off route, typically have not taken into account that sometimes the operator may require additional navigation instructions with regard to resuming his previous route and/or sometimes the vehicle operator may intentionally deviate from the previous route but wants to resumes the route with or without some modification at a later time. In other words, prior systems have not sufficiently taken into account the various reasons why an off course condition occurs, and therefore they do not provide sufficient options to the driver with regard to recovering, in an efficient manner, from an off course condition. Prior systems also typically don't remind the vehicle operator what off route recovery options are available.

In addition, prior systems have not efficiently visually displayed to the vehicle operator the difference between his present vehicle movement and the calculated route such that the operator himself can correct for off route deviations. While some prior systems have visually displayed the desired route, and some of these have also displayed current vehicle position, this has typically not been done in a minimal time comprehension format to permit, without excessive distraction, the vehicle operator himself to correct for off route deviations.

OBJECTS OF THE INVENTION

An object of the present invention is to provide an improved land vehicle navigation apparatus which has an improved visual display that assists the vehicle operator in implementing a vehicle navigation route.

A more specific object of the present invention is to provide a land vehicle navigation apparatus with a visual display that provides navigation information to the vehicle operator in an improved minimal time comprehension format.

Another more specific object of the invention is to provide an improved land vehicle navigation apparatus which permits the vehicle operator to efficiently select how he wants to respond to a detected off course condition.

BRIEF DESCRIPTION OF THE DRAWINGS

For a more complete understanding of the invention, reference should be made to the drawings, in which.

DESCRIPTION OF THE PREFERRED EMBODIMENTS

Figure 1:
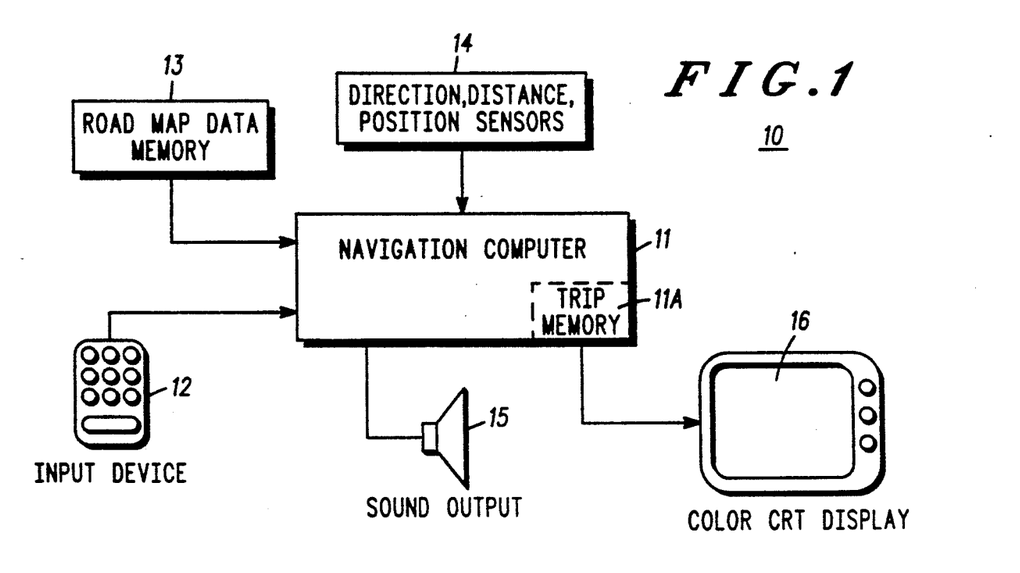
FIG. 1 is a schematic diagram of a land vehicle navigation apparatus which implements the present invention.

FIG. 1 illustrates a land vehicle navigation apparatus 10 which includes a navigation computer 11, preferably containing a microprocessor or other similar type of semiconductor computer. The computer 11 receives inputs from a manually actuable keyboard input device 12, a memory 13 containing stored road map data, and various vehicle sensors 14 which include vehicle direction, distance and position sensors. Basically, in response to input commands from the input keyboard device 12, the navigation computer 11 will calculate a desired navigation route for a vehicle (not shown) in which the navigation apparatus 10 is installed. This desired navigation route will be via fixed road paths which are defined by the road map data stored in the memory 13. This data can be stored on a compact disc (CD) which is loaded into the navigation computer for various different geographical areas, or the road map data can be received dynamically as the vehicle travels into various different geographical areas.

The sensors 14 essentially provide vehicle direction information, via direction sensors such as a flux gate compass and/or a differential odometer. Such direction sensors are known and used in prior navigation systems either alone on in combination. In addition, the sensors 14 include wheel travel distance sensors which provide information as to vehicle distance traveled. The sensors 14 may also include position sensors such as global positioning system (GPS) receivers which provide precise vehicle position location information. If GPS position sensors are not utilized, or only occasionally used, then the navigation computer will implement dead reckoning navigation computations based on distance traveled and vehicle direction. The implementation of dead reckoning position computations by a navigation system is very well known.

In response to receiving commands from the input device 12, the road map data from memory 13 and sensor data from the sensors 14, the navigation computer 11 will compute the desired navigation route between present vehicle location and the desired destination location specified by the input device 12. After computing a desired navigation route, the navigation computer 11 will then implement both audible and visual navigation guides to the vehicle operator to guide the vehicle to the destination along the calculated route. The audible navigation guides are provided by an audible speaker 15 shown in FIG. 1, while the visual guides are preferably provided by a color CRT display 16 shown in FIG. 1. In prior systems, both audible and visual guidance information is provided to the vehicle operator to alert him as to desired navigation maneuvers which are to be implemented at various roadway intersections encountered during implementation of the desired vehicle navigation route. The timing for these maneuver instructions is implemented in accordance with the navigation computer 11 determining estimated current position of the vehicle either by a dead reckoning determination based on direction and distance traveled for the vehicle or by use of a GPS position receiver.

Systems such as the navigation system 10 which have the basic features discussed above are well known and many such systems are described in prior technical articles. Some prior systems have noted that when actual vehicle travel deviates from a calculated navigation route, it is desired to provide a visual indication of such deviations so as to alert the vehicle operator. However, such prior systems fail to visually indicate to the vehicle operator, in a short time comprehension format, his deviation from the previously calculated route. Thus the operator may not be able to immediately distinguish between his present travel path and present location and the desired travel path desired travel and direction. Also, typically such prior systems do not provide the vehicle operator with a plurality of operator selectable recovery options, and do not advise the operator what recovery options are available. Typically, the only the options provided to the operator are either his resumption of the previous route within a specified amount of vehicle travel, or, if that does not occur, the automatic cancellation of the previous calculated route or the calculation of a new route. This does not adequately take into account the desires of the vehicle operator which may be to be request guidance information from the navigation computer to guide him back to the previous route or to modify the previous route or plan a new route from his current position rather than trying to resume the previous calculated route. Prior systems have generally offered just one of the above three options to the operator, but it is clear that any of these three may be desired by a vehicle operator.

The visual displays which were previously provided to indicate an off course deviation from a planned route were not short time comprehension displays so as to rapidly enable the operator to see his deviation and allow the operator to self-correct for vehicle course deviation and resume his original route. One major reason for this was the failure of the prior visual display to indicate the direction of desired travel for the calculated route. Also it was hard to instantly distinguish between the planned route visual display and the actual travel visual display. These deficiencies of prior systems have been overcome by the apparatus 10.

Several major features of the apparatus 10 relate to implementing various visual displays in response to detecting an off route condition which is indicative of the estimated current vehicle position differing from the calculated navigation route in accordance with a predetermined off route criteria. This "off route criteria" can correspond to the estimated current vehicle position differing by more than a predetermined amount of distance from the desired navigation route. This determination can be made by comparing vehicle current position with the vehicle position that should have been obtained if the vehicle had travelled a known distance and followed the planned navigation course along the road paths defined by the data stored in memory 13. Many prior navigation systems use a map matching technique to determine when sensed (measured) vehicle position should be corrected such that actual vehicle position is on one of the predetermined road paths stored in a memory. However, if such a correction exceeds a predetermined distance, then it is assumed that the vehicle is no longer on a possible roadway. In a similar manner, off route detection can occur by requiring that the vehicle not only to be on a stored roadway path, but that the vehicle be on a stored roadway path which comprises a segment of the calculated vehicle navigation route and that the vehicle is proceeding in a desired direction. Such off route navigation detection is implemented in software that is currently available from Navigation Technologies Corporation of California, USA. Similar other off route detection systems are described in prior navigation literature. However, it is not the implementation of off route detection of such systems which comprises a major feature of the apparatus 10, but it is the type of visual displays which are produced in response to such an off route detection which provide substantial advantages for the apparatus 10.

Figure 2:
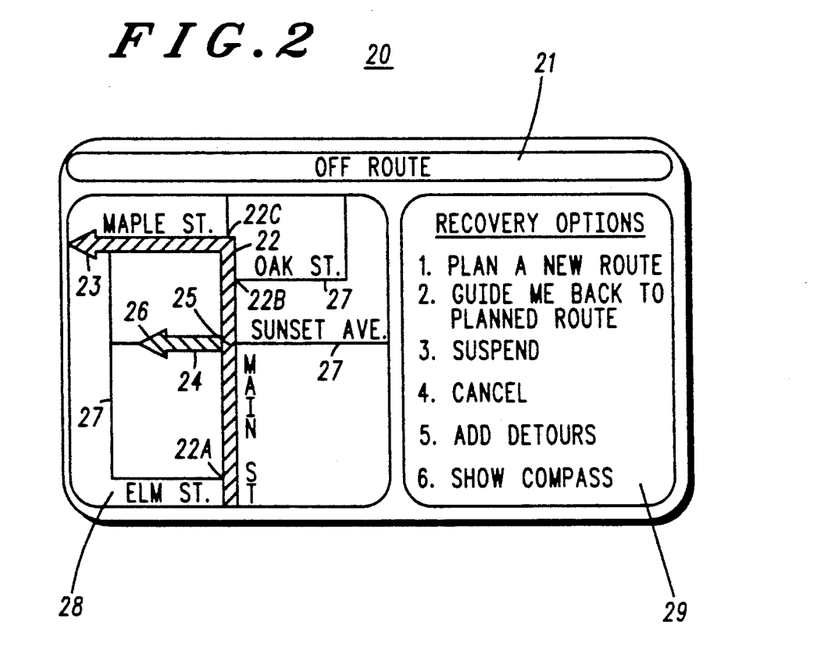
FIG. 2 is an illustration of a typical graphic visual display which may be produced by the apparatus shown in FIG. 1.

Referring now to FIG. 2, in response to an off route detection by the navigation computer 11, a visual display 20 is produced on the color CRT display 16. The major characteristics of the display 20 are an "OFF ROUTE" text heading 21 which identifies the display as an off route display. Thus the existence of the off route text heading 21 visually indicates to the operator that he is off route. This may also be accompanied by a suitable distinctive audible warning produced by the speaker 15. The display 20 preferably is only implemented in response to an off route condition.

The display 20 includes a visual display 22, in one color, of at least a portion of the calculated navigation route which traverses a plurality of road path intersections 22A, 22B, 22C. The display 22 includes a visual indication, in the form of an arrowhead 23, of the desired direction of travel along the calculated navigation route. In addition, the display 20 includes a visual display 24, in a contrasting color, of actual vehicle travel from at least an initially calculated point 25 at which the vehicle deviated from the calculated route to the estimated current vehicle position. In FIG. 2 the estimated current vehicle position corresponds to an arrowhead 26 superimposed on and part of the actual vehicle travel display 24. The orientation of arrowhead 24 indicates current sensed vehicle travel direction.

The displays 24 and 26 are preferably provided in a red color whereas the displays 22 and 23, are provided in a blue or green color. In addition, various nonhighlighted road paths 27 which are not part of the planned route are also provided as part of the off route visual display 20. The off route display 20 preferably should include the road paths 27 which are within a predetermined radius (e.g. ¼ mile) of the deviation point 25 and thus within the vicinity of the deviation point 25. Preferably, the length of the actual vehicle travel visual display 24 has a maximum length dimension such that after a sufficient amount of vehicle travel the tail of an arrow, comprising the displays 24 and 26, may not necessarily have a direct connection to the displayed navigation route 22. This can readily be achieved by merely erasing prior vehicle travel path indications as vehicle travel continues. Such a track erasing technique is readily implementable by standard software visual display techniques for tracking the vehicle position. This is desirable to prevent the visual display 20 from becoming too cluttered in case the actual off route vehicle travel continues for a substantial distance or vehicle travel loops back on itself.

What has been described so far and is indicated by the visual displays 22 through 27 is referred to as the map portion 28 of the visual display 20. In addition, the visual display 20 includes a recovery option table portion 29 which is shown in FIG. 2. The table portion 29 comprises a table listing of six different recovery option legends numbered 1 through 6. Each of these legends represents a different recovery option which can be selected by the vehicle operator by means of the input device 12. Each option represents a different manner of off route navigation recovery which is now selectable by the vehicle operator. Prior systems failed to visually advise the operator of what recovery options were available and failed to provide the operator with the recovery flexibility implemented by the present navigation apparatus 10. The operation of the navigation apparatus 10 and the manner in which it implements the visual display 20 and provides for operator selectable off route recovery options will now be described in detail in connection with the flowcharts shown in FIGS. 3A-3C.

Figure 3A:
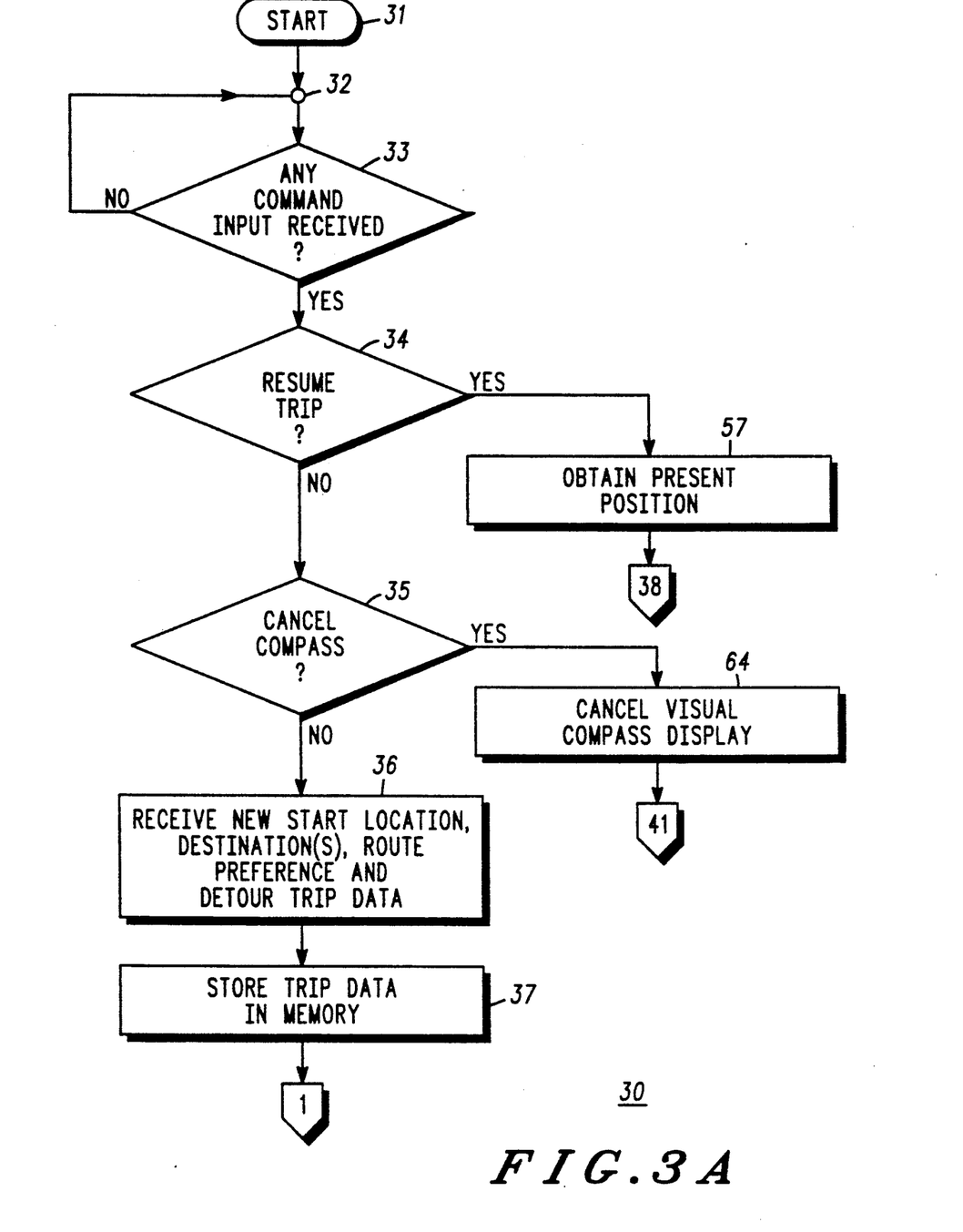
FIGS. 3A-3C comprise a flowchart which illustrates the operation of the apparatus in FIG. 1 in connection with the providing of the visual display shown in FIG. 2.
Figure 3B:
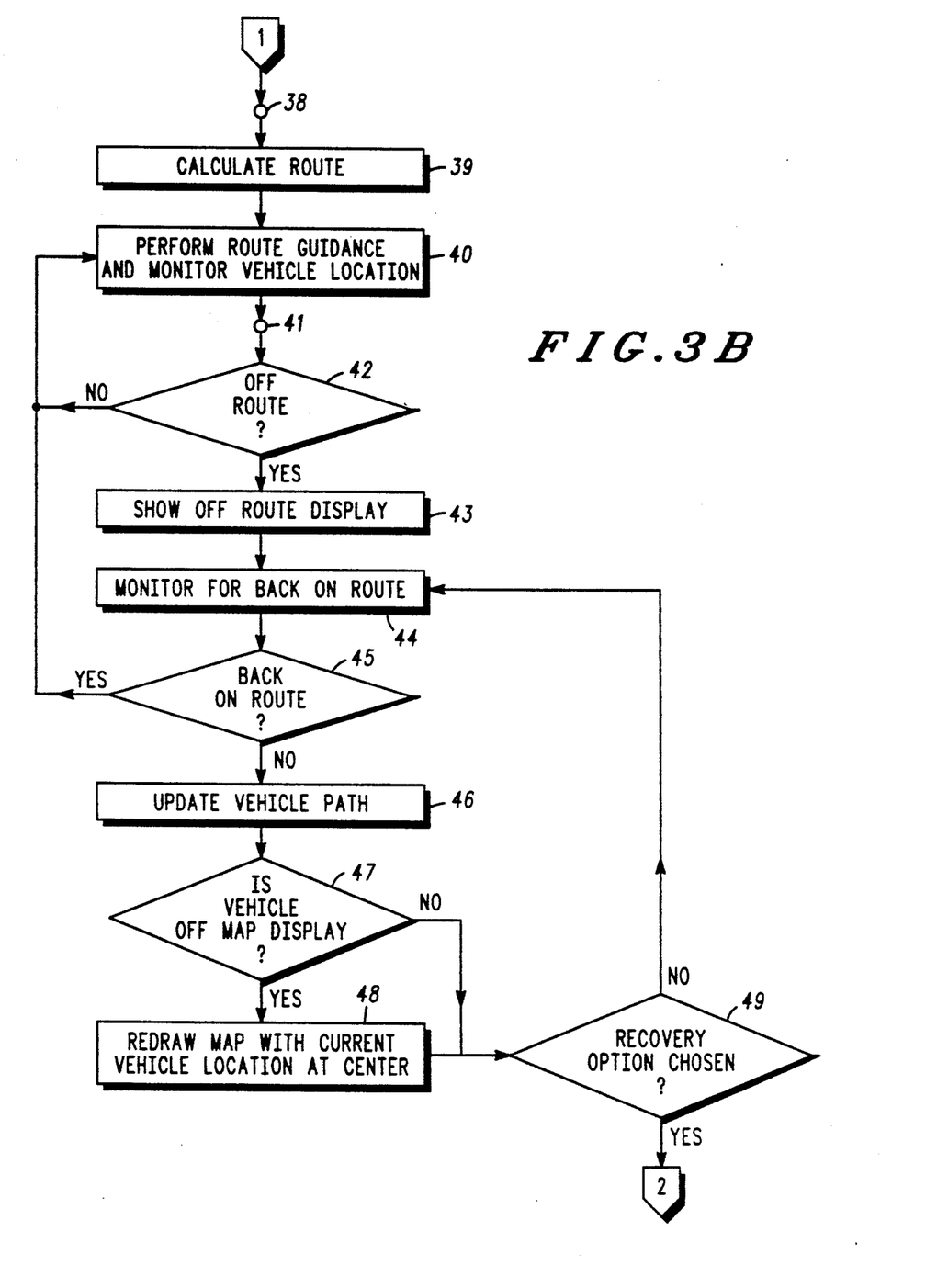
Figure 3C:
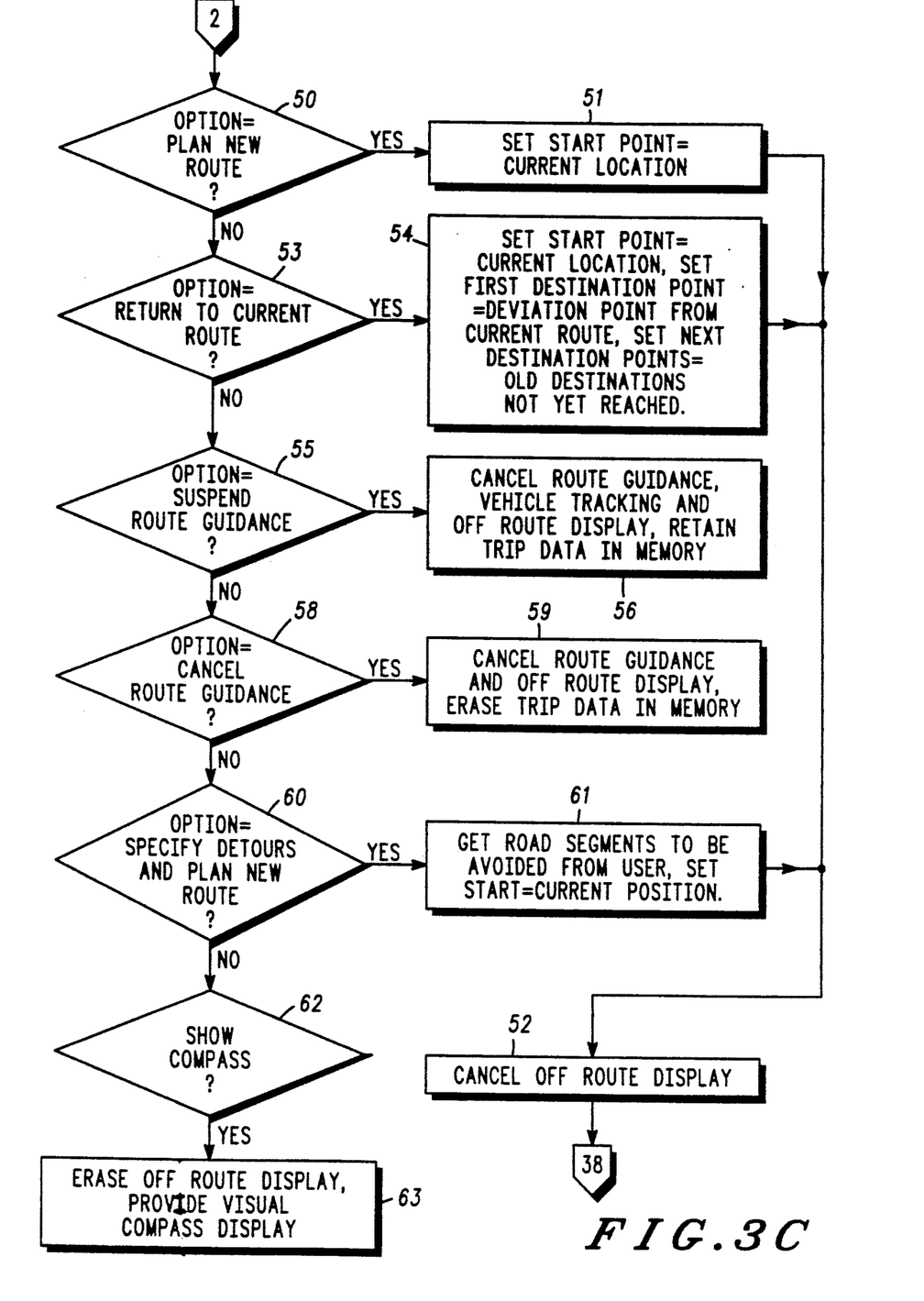

FIGS. 3A-3C illustrate a flowchart 30 which implements major functional operations of the navigation apparatus 10 shown in FIG. 1. The steps shown in flowchart 30 are primarily the result of apparatus control implemented by the navigation computer 11. The flowchart 30 is entered at an initial start point 31 and proceeds through a terminal 32 to a decision block 33 which asks if any navigation command inputs are received from the input device 12. If not, control recirculates to the terminal 32 and the apparatus 10 waits for receipt of a navigation command input signal. Once a navigation input command is received, a decision block 34 asks if this command was to resume a previously calculated trip, defined by trip data, to a previously specified destination. The term "trip data" as used herein includes data identifying the prior destination and any previous navigation route preference data which was programmed into the computer 11 from the input device 12. Typically a vehicle operator may specify that his navigation route should have the shortest time, or take the scenic route, or avoid certain roads-/areas, etc., and this comprises the route preference data. If the decision block 34 determines that a resume trip command has not been received, control passes to a decision block 35 which determines if a cancel the visual compass display command has been received. If not, control passes to a process block 36. The decision blocks 34 and 35 relate to navigation operations which may have been implemented by subsequent process blocks in the flowchart 30, and therefore these decision blocks will be further discussed subsequently.

At process block 36, since blocks 34 and 35 have determined that the received command input is not requesting the resumption of a previous specified trip or the cancelling of a visual compass display, new navigation trip data will be received. At block 36 the navigation computer 11 will receive new destination, route preference and detour trip data from the input device 12. In other words, for a new trip the vehicle operator will specify, via keyboard 12, where he wants to go, what type of route he would prefer to have the computer 11 calculate for him and any route "detours". "Detours" are defined as non-desired road segments or map areas which are to be avoided. The navigation computer 11 will also receive the present vehicle start position or location. This position may also be specified by the input device 12, or the position information may be obtained from the sensors 14, if they include a vehicle position sensor, or from previous dead reckoning vehicle position calculations by the computer 11.

After process block 36, process block 37 stores all of the "trip data", including current vehicle position, in a trip memory portion 11A which is internal to the navigation computer 11. Then control passes through a terminal 38 and then to a route calculation block 39 which accesses the stored trip data, as well as the road map data in memory 13, and proceeds to calculate a desired navigation route between the present vehicle position and the desired destination location. Many prior vehicle navigation systems implement such a function and therefore details of this step will not be recited herein except to state that this calculated navigation route will use fixed roadway paths which are defined by the roadway information which is stored in the memory 13.

After the process block 39, a process block 40 then proceeds to provide route guidance instructions to the vehicle operator while also monitoring current vehicle location. Substantially all prior vehicle navigation systems also implement this process step. The route guidance instructions provided by block 40 comprise at least audible vehicle maneuver instructions to be implemented at various intersections along the route. These instructions are sequentially provided as the vehicle approaches each intersection at which a maneuver is to be implemented. In addition, many systems, including apparatus 10, also provide visual guidance, in addition to the audible instructions, to assist the vehicle operator in implementing complex vehicle maneuvers. Such complex maneuvers may be encountered at road intersections involving more than two streets or turn-about type road intersections. During the implementation of the route guidance functions by the process block 40, the vehicle location is monitored since this is essential to ensure that the correct vehicle maneuver instructions are provided as the vehicle approaches the appropriate road intersections. The vehicle location monitoring can occur either by dead reckoning and/or other vehicle position sensors, such as GPS receivers.

During the route guidance and vehicle monitoring location process implemented by block 40, control periodically passes through the terminal 41 to the decision block 42 which inquires if the vehicle is "off route". Such an off route determination is made by comparing the present vehicle location and travel heading direction with the desired navigation route calculated by the navigation computer 11. In essence, if the vehicle position is found not to be on the road segments which comprise the desired navigation route, then an off route indication is provided. If it is determined that the vehicle is still on route, then control returns to the performance route guidance and monitor vehicle location block 40. If the vehicle remains on course, this sequence continues until the desired destination is achieved at which time all route guidance steps cease since the desired destination has been arrived at. Of course, if multiple destinations have been specified, the route guidance functions will continue until all destinations have been arrived at.

If the decision block 42 determines that an off route condition exists, then, in accordance with the apparatus 10, control passes to a process block 43 which implements providing an off route visual display such as the display 20 shown in FIG. 2. The determination of an off route condition by the decision block 42 can be achieved by map matching techniques in which monitored vehicle position is compared with the road map data stored in the memory 13 such that it can be determined exactly on what road the vehicle is currently located and the position of the vehicle on that road. If current vehicle position does not correspond to a road segment which is part of the calculated route, or if sensed vehicle heading does not correspond to the correct vehicle heading for proceeding along the calculated route, then an off route condition is determined. Software currently available from Navigation Technologies Corporation can be utilized to make such a determination. Other prior systems have also made similar off route determinations by comparing sensed vehicle location with the calculated navigation route and utilizing map matching techniques wherein an off route indication is provided if map matching indicates that the vehicle location is not on a road segment of the calculated route and/or the vehicle direction, as sensed by a direction sensor which is part of the sensors 14, does not correspond to the desired vehicle navigation route direction. Since the computer 11 knows where the vehicle is, where the roads are, and what road segments comprises the navigation route, the computer can also for an off route detection determine where the vehicle deviated from the calculated route. This corresponds to location 25 in FIG. 2.

In response to a determination of an off route condition by the decision block 42, the block 43 produces the visual display 20 in FIG. 2. As previously noted this display includes a visual display 22 of a portion of the desired navigation route along with the arrowhead 23 indicating the desired direction of travel for the navigation route display 22. Also, various road paths 27 within the vicinity of the point 25 at which a deviation from the desired navigation route occurred are illustrated along with a display 24 of the path of actual vehicle travel and an arrowhead display 26 of current vehicle position and the direction of actual vehicle travel.

A major feature of the apparatus 10 is that the navigation route display 22 and its arrowhead 23 are shown in a different color than the actual vehicle travel portion 24 and its vehicle position and direction arrowhead 26. This assists the vehicle operator in rapidly determining what has gone wrong that resulted in the off route condition, as well as how the vehicle operator can navigate the vehicle so as to resume the calculated navigation route. It is obviously critical to provide information to the vehicle operator with as little distraction as possible since the operator is busy driving the vehicle. Providing displays in difference colors, including preferably red for the erroneous actual vehicle travel and preferably blue or green for the desired navigation path, assists in conveying information to the vehicle operator in a minimal comprehension time format.

Another feature of the visual display 20 provided by the block 43 is that display portion 29 visually indicates a table of operator selectable off route recovery options. Thus the vehicle driver now is visually made aware of several recovery options which are available, and he can now select the recovery option which best suits his needs. These options will be discussed subsequently in connection with further steps of the flowchart 30.

It should be noted that preferably until an off route condition is detected by the decision block 42, the color CRT display 16 does not show the off route display 20, but instead merely visually indicates desired road intersection vehicle maneuvers for implementing the calculated navigation route. This is preferably done by visually displaying just turn arrows rather than displaying multiple roads and intersections in a detailed map format.

After the process block 43, control passes to a process block 44 which represents the navigation computer 11 comparing actual vehicle travel with the desired calculated navigation route. Decision block then 45 determines if there is coincidence between actual vehicle travel and the calculated navigation route at any point along the navigation route. If so, route guidance resumes since control passes back to the process block 40. If not, control passes from the block 45 to a process block 46 which updates the current actual vehicle travel path displayed as part of display 20. A decision block 47 then determines if the actual vehicle position to be displayed by the arrowhead 26 is off or at the edge of the current map display portion 28 which is being displayed. If so, then the map is redrawn by a process block 48 and control passes to a decision block 49. If the map portion 28 is not to be redrawn by block 48, control directly passes from decision block 47 to decision block 49. Decision block 49 determines if the vehicle operator has selected any one of the six recovery options shown in the recovery option display portion 29 of the visual display 20. If not, control passes back to the process block 44. The redrawing of the map if vehicle position goes off of the map portion 27, is readily implemented by many prior art systems in which map redrawing occurs as a vehicle path progresses from one limited display map area to another. Since many prior art systems implement such a feature, no further discussion of this feature is needed.

Essentially, the blocks 47 through 49 determine if vehicle position and direction match the previously calculated navigation route and if the vehicle operator has selected one of the visually displayed recovery options available to him. If no recovery option is selected, the vehicle operator can implement his own recovery by guiding the vehicle back to the calculated navigation route since he is now aware of not only his current position and travel direction by virtue of the red display of elements 24 and 26, but he is also aware, by virtue of the contrasting color display of the elements 22 and 23, of the desired navigation route and the desired direction of travel along this route. While some prior systems show the calculated route, typically they do not indicate the desired direction of travel along the route, and this would hamper the driver in trying to resume the prior route. The advantage of the present apparatus over such prior systems would exist even if display portion 28 were always visually displayed instead of just being displayed in response to on off route detection.

If the vehicle operator desires to choose a recovery option corresponding to one of the 6 options in the recovery display portion 29, this choice is implemented by manual actuation of the keyboard representing the input device 12. Thus by using keyboard 12 to type in a specific command code associated with each of the recovery options, computer 11 can recognize that a recovery option has been selected, and then the computer 11 determines which recovery option was selected. In such an event decision block 49 recognizes the choice of a recovery option and control passes to other blocks which determine what option was selected.

From block 49 control passes to a decision block 50. The block 50 essentially asks if the 1st option of planning a new route has been selected. If so, control passes to a process block 51 which sets the start point of a new trip at the vehicle's current location as measured by the sensors 14 in combination with the navigation computer 11. This current location will then replace the original start location held in the memory portion 11A of the computer 11 wherein this original start location resulted in the previous calculation of the navigation route. Then control passes to a process block 52 which cancels the off route display comprising the display 20 and control returns to the terminal 38 and then to the process block 39. What this does is calculate a new navigation route, upon receipt of recovery option 1 selection instructions from the vehicle operator, wherein now the new route is from the vehicle's current position to the previously specified destination. This new route still utilizes the previous destination, route preference and trip detour data that were stored as trip data in the memory portion 11A of the computer 11. The off route display 20 is cancelled by process block 52 since the vehicle is no longer off route because a new route is now calculated for the vehicle from its present position.

If the operator selected a recovery option, but it was not the option 1 of planning a new route, control passes from the decision block 50 to the decision block 53 which inquires if the operator selected the option 2 of guiding him back to the previous (current) navigation route. If this option was selected, then a process block 54 will set the start point for a trip at the vehicle's current location, set a first destination point for a trip at the point 25 at which actual vehicle travel deviated from the current navigation route and set the next destination points for the trip to the previous trip destinations which were not yet reached during previous vehicle travel. Then control proceeds to the block 52 which cancels the off route display. Then the route calculation block 39 calculates a route which includes getting back to the deviation point 25 and then, using the same trip preferences and detours previously specified, reaching the end destinations that were previously specified. In many situations it is desirable to merely get back to your original route and receive guidance instructions on how to do that rather than calculating a new route from your current vehicle location. Previous systems did not provide this type of operator selectable flexibility to the vehicle operator.

If the vehicle operator selects the recovery option 3 of suspending route guidance, this is determined by decision block 55. In that event, control passes to a process block 56 which cancels route guidance and vehicle tracking functions as well as cancelling the off route display 20. However, all of the trip data previously retained in the memory portion 11A of the navigation computer 11 is still maintained. In this option, the operator of a vehicle may have decided to intentionally take a side trip. This recovery option allows the vehicle operator to avoid being continuously reminded that he is off course when he already knows that. However, it does permit him to resume his trip by virtue of the input device 12 implementing a resume command which is received by the navigation computer 11. In this event, the decision block 34, when it determines that a resume trip command has been received, will obtain the present position by virtue of a process block 57 and then proceed to process block 39 via terminal 38. Block 39 will then calculate a new route to the same destination that the vehicle operator has previously specified using the same route preferences and detours previously specified by the vehicle operator.

Another recovery option selectable by the vehicle operator is the cancellation of route guidance. The selection of this option is detected by decision block 58 which, if this option is selected, results in control passing to a process block 59. The process block 59 cancels all route guidance functions, cancels the off route display 20 and erases all of the previously stored trip data that was contained in the memory portion 11A of the navigation computer 11. In this instance, the vehicle operator has decided to abort the trip which he has previously planned and therefore there is no need to store the previous destinations and route preference data that he had programmed into the navigation computer 11.

An additional option available to the vehicle operator is the adding of specific detours (roads or areas to be avoided) to his route. Decision block 60 determines if this option has been selected by the vehicle operator. If so, control passes to a process block 61 during which the input device 12 will be used by the vehicle operator to specify specific road segments or areas which are to be avoided. These detours are stored in memory 11A. Block 61 also sets the trip start location in memory 11A equal to the vehicle's current location as determined by sensors 14 in conjunction with computer 11. This current location replaces the initial vehicle start location which was previously stored in memory 11A. After block 61, the off route display 20 is cancelled by process block 52 and then a new route is calculated by the process block 39 using the new specified road segment detours, the current vehicle position as the start point for a trip, and the initial destinations and route preferences previously programmed into the computer 11 by the vehicle operator during process block 36.

The off route recovery option of allowing the adding of detours represents a significant advantage over prior systems since it more closely corresponds to actual traffic problems which may occur during a trip. If the reason that a vehicle is off course is because a road was closed or traffic was so heavy that the vehicle operator insisted on going off course, then the detour recovery option 5 allows the planning of a new route without respecifying the same road preferences and destinations that the vehicle operator originally programmed into the computer 11. However, now the operator has been able to add specific detours to avoid the problems that he has encountered. Without this feature, prior systems might result in guiding the vehicle back to the same impassable or congested road segments that the vehicle driver wanted to avoid.

A final recovery option selectable by the vehicle operator is the visual display of a compass. Selection of this option is determined by a decision block 62. If this option has been selected control passes to a process block 63 which erases the off route display 20 and provides in its place a visual compass display of vehicle heading direction. In some instances, this type of recovery option is preferred by the vehicle operator. If at any subsequent time the vehicle operator decides to cancel the visual compass display, decision block 35 will determine this and control will then pass to a process block 64 which will cancel the visual compass display. Then, control will pass to the terminal 41 and from there to the off route detection decision block 42.

It is understood that after process blocks 56, 59 or 63, flowchart 30 is reentered at start location 31 to determine if any new input commands are received.

The vehicle navigation apparatus 10 has many advantages over prior navigation systems. In the event of an off course condition, different colored displays of the desired navigation route and actual vehicle travel are provided. This allows the vehicle operator to more readily determine how to resume the previous navigation route. In addition, the navigation apparatus 10 provides the vehicle operator with a visual display of the many recovery options which are available to him. Thus the operator is now aware of what his recovery choices are. In addition, by indicating not only the desired navigation route on a visual display, but also the desired direction of travel on the navigation route, a much more understandable display of navigation route information is provided to the vehicle operator in a minimal time comprehension format. He can now see not only the navigation route that was planned for him, but the desired direction of travel along this navigation route even when the destination and start locations of his trip may not be currently displayed on a visual screen. This provides the vehicle operator with navigation information which allows him to more readily implement the desired navigation route when off course. This feature of indicating planned route travel direction is useful even if the route information is not provided as part of an off route display, but is provided as a part of a standard vehicle position and planned route display.

While I have shown and described specific embodiments of this invention, further modifications and improvements will occur to those skilled in the art. Such modifications could include providing additional off route recovery options in addition to those described herein. All such modifications which retain the basic underlying principles disclosed and claimed herein are within the scope of this invention.

We claim:

1. Land vehicle navigation apparatus with visual display comprising:
   means for calculating a desired navigation route for a vehicle, via fixed road paths, between a start location and a desired destination location;
   means for determining estimated current position of the vehicle;
   wherein the improvement comprises,
   display means for visually displaying to said vehicle operator in one color at least a portion of said calculated navigation route, which displayed portion includes a plurality of different road path intersections, on a road map display along with displaying, on said road map display in a second contrasting color, actual vehicle travel as a displayed travel path between a predetermined point on said road map display to a position on said road map display corresponding to said estimated current vehicle position.

2. Land vehicle navigation apparatus according to claim 1 wherein said display means includes means for providing a current actual travel direction visual indication, as an arrowhead, as part of said visual display of actual vehicle travel.

3. Land vehicle navigation apparatus according to claim 2 wherein said display means includes means for providing a desired travel direction visual indication along said route as part of said visual display of said displayed portion of said calculated route.

4. Land vehicle navigation apparatus according to claim 3 wherein said display means provides an arrowhead as part of said displayed portion calculated navigation route which indicates desired travel direction along said visually displayed portion navigation route.

5. Land vehicle navigation apparatus according to claim 4 wherein the location of said arrowhead on said actual vehicle travel visual display corresponds to said estimated current vehicle position and the orientation of said arrowhead indicates current actual travel direction.

6. Land Vehicle navigation apparatus with visual display comprising:
   means for calculating a desired navigation route for a vehicle, via fixed road paths, between a start location and a desired destination location;
   means for determining estimated current position of the vehicle;
   means for detecting an off route condition indicative of said estimated current vehicle position differing from said calculated route in accordance with predetermined off route criteria;
   wherein the imrovement comprises,
   off route display means, in response to said off route detecting means detecting said off route condition, for producing a visual off route road map display for visually displaying to said vehicle operator in one color at least a portion of said calculated navigation route, which displayed portion includes a plurality of road path intersections, along with displaying, in a second contrasting color on said off route road map display, actual vehicle travel as a displayed travel path between, at least initially, a calculated point at which said vehicle deviated from said calculated route to the estimated current vehicle position.

7. Land vehicle navigation apparatus according to claim 6 wherein said off route display means includes means for providing a current actual travel direction visual indication as part of said visual display of actual vehicle travel.

8. Land vehicle navigation apparatus according to claim 7 wherein said off route display means includes means for displaying an arrowhead on said actual vehicle travel visual display, with the location of said arrowhead corresponding to said estimated current vehicle position.

9. Land vehicle navigation apparatus according to claim 8 wherein said off route display means includes means for displaying an arrow as said display of actual vehicle travel with the length of said display of actual vehicle travel having a maximum length dimension and the location of the head of said arrow indicating said estimated current vehicle position with said arrowhead also indicating current vehicle travel direction.

10. Land vehicle navigation apparatus according to claim 9 which includes means for automatically terminating said off route visual display of at least said actual vehicle travel in response to detecting said vehicle resuming travel on said calculated route.

11. Land vehicle navigation apparatus according to claim 6 wherein said off route display means also provides a visual display, at least initially, of road paths in the vicinity of said point at which said vehicle deviated from said calculated route with said point being generally centrally located with regard to the initial off route display provided.

12. Land vehicle navigation apparatus according to claim 6 which includes means for automatically terminating said off route visual display of at least said actual vehicle travel in response to detecting said vehicle resuming travel on said calculated route toward said destination location.

13. Land vehicle navigation apparatus according to claim 12 wherein said terminating means terminates said off route visual display in response to detecting said vehicle resuming travel on said calculated route toward said destination location at any point along said route.

14. Land vehicle navigation apparatus according to claim 6 wherein said off route display means includes means for providing a desired travel direction visual indication along said route as part of said visual display of said calculated route.

15. Land vehicle navigation apparatus according to claim 14 wherein said off route display means provides an arrowhead as part of said displayed portion of said calculated navigation route which indicates desired travel direction along said visually displayed navigation route.

16. Land vehicle navigation apparatus with visual display comprising:
means for receiving a user specified desired destination location and a vehicle start location and calculating a desired navigation route for a vehicle, via fixed road paths, between said start location and said desired destination location;
means for determining estimated current position of the vehicle;
display means for selectively visually displaying to the vehicle operator a road map display with a visual display for at least a portion of said calculated navigation route, which displayed portion includes a plurality of road path intersections, and the estimated current vehicle position, wherein said displayed portion of said calculated route includes a visual indication of the desired direction of travel along said displayed portion of said route even when said desired destination and start locations are not displayed on said road map display.

17. Land vehicle navigation apparatus with visual display according to claim 16 which includes means for detecting an off route condition indicative of said estimated current vehicle position differing from said calculated route in accordance with predetermined off route criteria, and
off route display means, in response to said off route detecting means detecting said off route condition, for producing a visual off route road map display for visually displaying to said vehicle operator at least a portion of said calculated navigation route and road paths other than said route and displaying actual vehicle travel at least initially from a calculated point at which said vehicle deviated from said calculated route to the estimated current vehicle position, said off route display of said calculated navigation route including a visual indication of desired travel direction along said calculated navigation route.

18. Land vehicle navigation apparatus according to claim 17 wherein said off route display means includes means for displaying current vehicle travel direction as part of said actual vehicle travel visual display.

19. Land vehicle navigation apparatus according to claim 18 wherein said off route display means displays said current actual vehicle travel direction as an arrowhead.

20. Land vehicle navigation apparatus according to claim 19 wherein said off route display means includes means for providing said display of estimated current vehicle position by the location of said visually displayed arrowhead which indicates current vehicle travel direction.

21. Land vehicle navigation apparatus according to claim 20 wherein said display means includes means for providing an arrowhead for indicating said desired travel direction along said calculated navigation route.

22. Land vehicle navigation apparatus according to claim 16 wherein said display means includes means for providing an arrowhead for indicating said desired travel direction along said calculated navigation route.

23. Land vehicle navigation apparatus with visual display comprising:
means for calculating a desired navigation route for a vehicle, via fixed road paths, between a start location and a desired destination location;
means for determining estimated current position of the vehicle;
means for detecting an off route condition indicative of said estimated current vehicle position differing from said calculated route in accordance with predetermined off route criteria;

wherein the improvement comprises, off route display means, in response to said off route detection means detecting said off route condition, for producing a visual off route display for visually displaying to said vehicle operator an indication of said off route condition while also visually indicating, as part of said visual off route display produced in response to detection said off route condition, a plurality of possible operator selectable off route recovery options, and recovery means for providing the vehicle operator with a plurality of operator selectable off route recovery options in response to detecting said off route condition, each of said recovery options corresponding to an associated one of said plurality of visually displayed options and including at least the options of (1) calculating a new route to said desired destination from current vehicle position and (2) providing vehicle maneuver guidance instructions to the vehicle operator for resuming said previously calculated route while retaining said previously calculated route in a memory.

24. Land vehicle navigation apparatus according to claim 23 wherein said off route display means includes means for visually displaying to said vehicle operator as a road map display at least a portion of said calculated navigation route, which displayed portion includes a plurality of road path intersections, along with displaying actual vehicle travel at least initially from a calculated point at which said vehicle deviated from said calculated route to the estimated current vehicle position.

25. Land vehicle navigation apparatus according to claim 23 wherein said navigation route calculating means includes means for receiving vehicle operator specified trip data, including at least desired destination data, and using said trip data in calculating said route, and wherein said off route recovery means includes means for providing the vehicle operator with the option of (3) temporarily suspending any in-route vehicle maneuver guidance instructions for arriving at said desired destination, but retaining in memory said trip data for subsequent use by said vehicle operator if desired.

26. Land vehicle navigation apparatus according to claim 23 wherein said navigation route calculating means includes means for receiving vehicle operator specified trip data, including at least desired destination data, and using said trip data in calculating said route, and wherein said off route recovery means includes means for providing said vehicle operator with the option of (4) cancelling said previously calculated route, said trip data and any associated in route vehicle maneuver guidance instructions to be provided to said vehicle operator for implementing said previously said calculated route.

27. Land vehicle navigation apparatus according to claim 23 wherein said off route recovery option means includes means for providing the vehicle operator with the option of (5) modifying said previously calculated route by specifying at least one of road segments and intersections to be avoided and then recalculating a new navigation route to said desired destination.

28. Land vehicle navigation apparatus according to claim 23 wherein said off route display means provides a visual display of a plurality of visual wording legends each indicative of a different recovery option, each visually displayed option selectable by the vehicle operator via a manually actuable apparatus which is part of said recovery means.

29. Land vehicle navigation apparatus according to claim 28 wherein at least three of said wording legends are provided for selecting at least three different options and said manually actuable apparatus comprises a keyboard type device.

30. Land vehicle navigation apparatus according to claim 28 wherein said off route recovery options are displayed in a table form with each option having an associated visually displayed legend.

31. Land vehicle navigation apparatus according to claim 23 wherein said off route recovery means includes means for providing the vehicle operator with the option of (6) visually displaying a compass display indicative of current direction of travel of said vehicle.

32. Land vehicle navigation apparatus with visual display comprising:
means for calculating a desired navigation route for a vehicle, via fixed road paths, between a start location and a desired destination location;
means for determining estimated current position of the vehicle;
means for detecting an off route condition indicative of said estimated current vehicle position differing from said calculated route in accordance with predetermined off route criteria;
wherein the improvement comprises,
off route display means, in response to said off route detection means detecting said off route condition, for producing a visual off route display for visually displaying to said vehicle operator an indication of said off route condition while also visually indicating, as part of said visual off route display produced in response to detection said off route condition, a plurality of possible operator selectable off route recovery options, and
recovery means for providing the vehicle operator with a plurality of operator selectable off route recovery options in response to detecting said off route condition, each of said operator selectable recovery options corresponding to an associated one of said plurality of visually displayed options.

33. Land vehicle navigation apparatus according to claim 32 wherein said off route recovery option means provides a plurality of visual wording legends each indicative of a different recovery option, each visually displayed option selectable by the vehicle operator via a manually actuable apparatus which is part of said recovery means.

34. Land vehicle navigation apparatus according to claim 33 wherein at least three of said wording legends are provided for selecting at least three different options and said manually actuable apparatus comprises a keyboard type device.

35. Land vehicle navigation apparatus with visual display comprising:
means for calculating a desired navigation route for a vehicle, via fixed road paths, between a start location and a desired destination location;
means for determining estimated current position of the vehicle;
means for detecting an off route condition indicative of said estimated current vehicle position differing from said calculated route in accordance with predetermined off route criteria;
wherein the improvement comprises, off route display means, in response to said off route detection means detecting said off route condition, for producing a visual off route display for visually displaying to said vehicle operator a road map display with a visual display in one color of at least a portion of said calculated navigation route traversing a plurality of road path intersections and a visual indication of desired direction of travel along said route, along with displaying, in a second contrasting color on said road map display, actual vehicle travel at least initially from a calculated point at which said vehicle deviated from said calculated route to the estimated current vehicle position, said off route display means, in response to said off route detection means detecting said off route condition, also visually indicating a plurality of possible operator selectable off route recovery options, and recovery means for providing the vehicle operator with a plurality of operator selectable off route recovery options in response to detecting said off route condition, each of said recovery options corresponding to an associated one of said visually displayed options and including at least the options of (1) calculating a new route to said desired destination from current vehicle position and (2) providing vehicle maneuver guidance instructions to the vehicle operator for resuming said previously calculated route while retaining said previously calculated route in a memory.

36. Land vehicle navigation apparatus according to claim 35 wherein said off route display means provides an arrowhead as part of said displayed calculated navigation route which indicates desired travel direction along said visually displayed navigation route.

37. Land vehicle navigation apparatus according to claim 36 wherein said off route display means includes means for displaying an arrowhead on said actual vehicle travel visual display, with the location of said arrowhead corresponding to said estimated current vehicle position.

* * * * *